Feb. 13, 1962 R. J. VERHOTA 3,021,100
SUPPORT
Filed Sept. 2, 1960 2 Sheets-Sheet 1
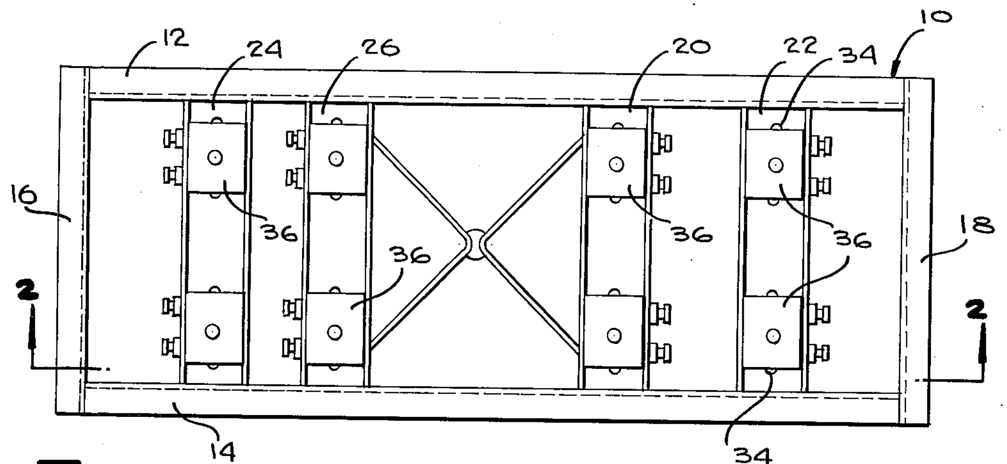
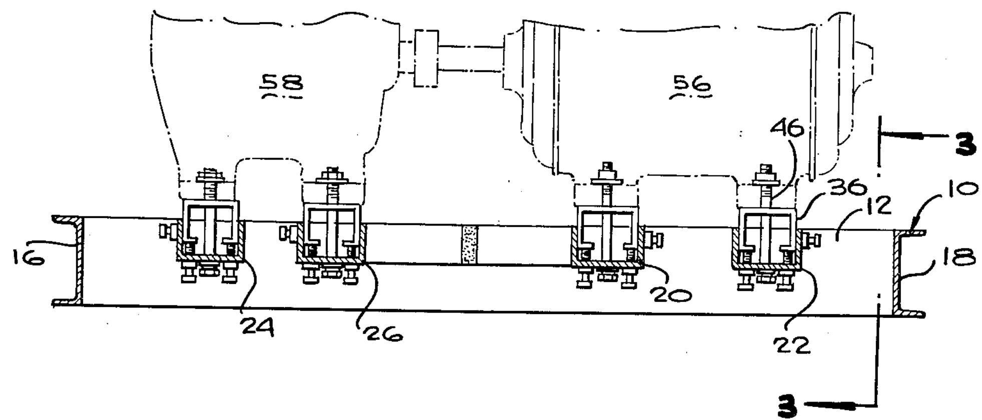
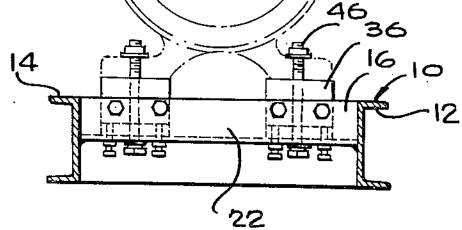
INVENTOR.
ROBERT J. VERHOTA
BY
McMorrow, Berman & Davidson
ATTORNEYS Feb. 13, 1962 R. J. VERHOTA 3,021,100
SUPPORT
Filed Sept. 2, 1960 2 Sheets-Sheet 2
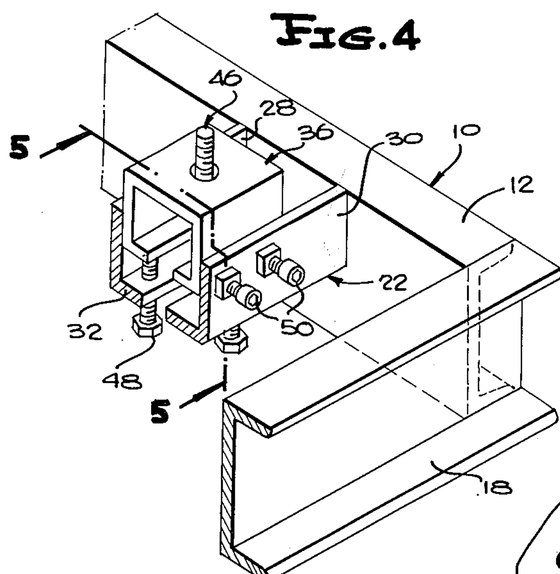
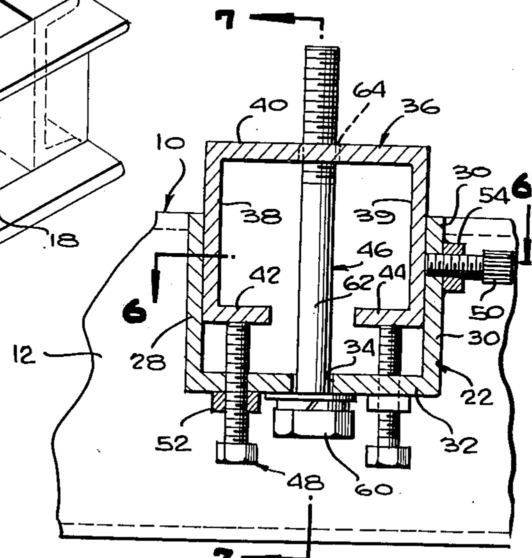
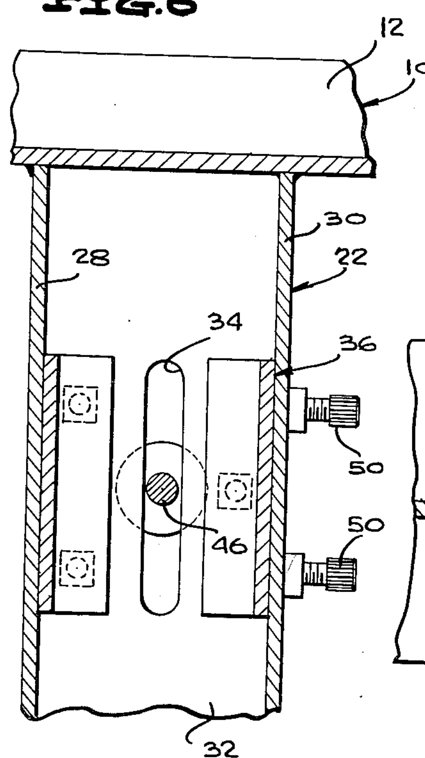
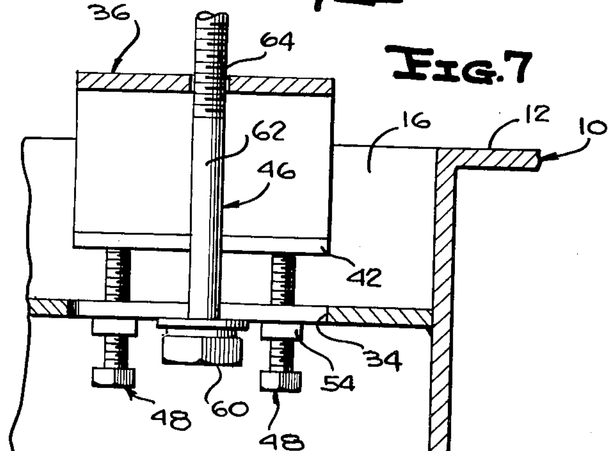
INVENTOR.
ROBERT J. VERHOTA
BY
McMorrow, Berman & Davidson
ATTORNEYS United States Patent Office 3,021,100
Patented Feb. 13, 1962

3,021,100
SUPPORT

Robert J. Verhota, 1116 Badger St., La Crosse, Wis.

Filed Sept. 2, 1960, Ser. No. 53,675
3 Claims. (Cl. 248—23)

The present invention relates to supports generally and in particular to a support for an electric motor and a machine to be driven such as an air compressor or the like.

Motor supports have been in use for as long as electric motors but few have been made which permit mounting of an electric motor and an air compressor or the like on the same support. It is necessary, when mounting an electric motor and a machine to be driven on the same base or support, that means be provided for adjusting the height and position of the motor or the machine so that their shafts are in exact alignment. This is not only true when the shafts are in parallel relation with respect to each other but is essentially true when the shafts are in end to end relation and are directly coupled together.

An object of the present invention is to provide a support for an electric motor and a machine to be driven which permits adjustment of the support pads upwardly for limited sliding movement on the support so as to adjust to electric motor bases of varying sizes.

Another object of the present invention is to provide a support for an electric motor and a machine to be driven, such as an air compressor or the like, which permits exact alignment of the shafts of the machine and motor for direct coupling of such shafts.

A further object of the present invention is to provide a support for an electric motor and a machine to be driven which is simple in structure, one sturdy in construction, one economical to manufacture and assemble, and one which is highly effective in action.

These and other objects and advantages of the present invention will be fully apparent from the following description when taken in conjunction with the annexed drawings, in which:

FIGURE 1 is a plan view of the support of the present invention;

FIGURE 2 is a view taken on the line 2—2 of FIGURE 1, the dotted lines indicating a motor and a machine to be driven mounted upon the support;

FIGURE 3 is a view taken on the line 3—3 of FIGURE 2;

FIGURE 4 is an isometric view of the corner of the support frame, on an enlarged scale;

FIGURE 5 is a view taken on the line 5—5 of FIGURE 4 and on an enlarged scale;

FIGURE 6 is a view taken on the line 6—6 of FIGURE 5; and

FIGURE 7 is a view taken on the line 7—7 of FIGURE 5.

Referring in greater detail to the drawings in which like numerals indicate like parts throughout the several views, the support of the present invention comprises a frame 10 having laterally spaced side pieces 12 and 14, and end pieces 16 and 18 connecting the adjacent ends of the side pieces 12 and 14 together.

A pair of slats 20 and 22 are arranged in parallel spaced relation with respect to each other and are positioned transversely of the side pieces 12 and 14 intermediate the ends of the latter and have their ends fixedly attached, by welding or other suitable means, to the side pieces 12 and 14.

Another pair of slats 24 and 26 are similarly arranged in spaced relation with respect to the pair of slats 20 and 22 and are inwardly of and spaced from the end piece 16, as shown in FIGURE 1. As all of the slats

20, 22, 24, and 26 are identical, they will be described with reference to slat 22.

As shown in FIGURE 5, the slat 22 is U-shaped in cross-section and is fabricated from a piece of channel steel, aluminum, or the like, as found practical. The slat 22 has flanges 28 and 30 projecting upwardly from its web 32 and is disposed with the free ends of the flanges 28 and 30 coplanar with, as shown in FIGURE 4, the upper face of the side piece 12 which also is formed from a piece of channel metal, steel, aluminum, or the like.

The web 32 of the slat 22 is disposed in spaced relation above the lower face of the frame 10, also as shown in FIGURE 4.

The web 32 of each of the slats 20, 22, 24, and 26, is provided with a closed slot 34 inwardly of and adjacent each of the ends of such slats.

A mounting pad is superimposed upon each of the slats 20, 22, 24, and 26, adjacent each slot 34 and is connected to the adjacent slat for limited up and down movement and for limited sliding movement therealong, such mounting pads being designated generally by the reference numeral 36.

As shown most clearly in FIGURES 4 and 5, the mounting pad 36 has side members 38 and 39, a top member 40 extending over and formed integrally with the upper ends of the side members 38 and 39, and flanges 42 and 44 projecting inwardly from the lower ends of the side members 38 and 39 and having their free ends spaced from each other so as to provide an opening for receiving therethrough a bolt 46.

Means, embodying spaced fastening elements or bolts, rotatably supported in the adjacent slat 20, 22, 24, or 26, supports each of the pads 36 in such slat for movement upwardly and downwardly with respect to the slat. These bolts are shown most clearly in FIGURES 5 and 7, and designated generally by the reference numeral 48.

Releasable means, embodying other bolts 50, are carried by the flanges 30 of each of the slats 20, 22, 24, and 26, and are engageable with the adjacent side member 39 of the adjacent mounting pad 36 for holding the pad 36 in its position of sliding movement along the respective slat.

Nuts 52 welded to the underface of the web 32 of each of the slats 20, 22, 24, and 26, provide threaded means for rotatably supporting the bolts 48 for raising and lowering the adjacent mounting pad 36. Other nuts 54 welded to the flange 30 of each slat 20, 22, 24, and 26, provides means for rotatably supporting the bolts 50 in the flange 30 so that when they are screwed in tightly against the member 39 of the adjacent pad 36, the pad 36 is prevented from moving either upwardly or longitudinally with respect to the adjacent part of the respective slat.

In use, a motor 56 and machine 58 to be driven by the motor 56, as shown in dotted lines in FIGURES 2 and 3, may be mounted upon the adjacent mounting pads 36 with the pads 36 adjustable in the respective slats to accommodate various dimensions between the holes in the base of such motor 56 and machine 58.

Additionally, by loosening the bolts 50 and turning the bolts 48 in one direction or another with the bolts 46 loosened, the mounting pads 36 may be adjusted upwardly and downwardly within their respective slats so as to raise or lower the motor 56 and machine 58 as found necessary for proper operation of the latter.

The bolts 46 have their heads below the web 32 of the respective slat and exteriorly of the web 32, such head being shown in FIGURE 5 and designated by the reference numeral 60. The shank 62 of the bolt 46 extends through the slot 34, through the opening between the free ends of the flanges 42 and 44 of the pad 36, and through a hole 64 provided in the top piece 40 of each pad 36, as shown most clearly in FIGURES 4 to 7.

The bolts 46, as shown in FIGURE 2, are used to secure the motor 56 and machine 58 on the frame 10.

What is claimed is:

1. In a support, a frame including a pair of spaced side pieces, at least two slats arranged in parallel spaced relation positioned transversely of said side pieces intermediate the ends thereof and having their ends fixedly attached to said side pieces, a mounting pad superimposed upon each of said slats, means embodying spaced fastening elements rotatably supported in the adjacent slat supporting each pad in the adjacent slat for movement upwardly and downwardly with respect to said slat and for limited sliding movement along said slat, and releasable means embodying spaced bolts rotatably supported in the adjacent slat and engageable with the adjacent pad for holding the latter in selected positions of sliding movement along said slat.

2. In a support, a frame including a pair of spaced side pieces, at least two slats arranged in parallel spaced relation positioned transversely of said side pieces intermediate the ends thereof and having their ends fixedly attached to said side pieces, a plurality of mounting pads each including a pair of laterally spaced upright side members, a top piece extending over the upper ends of said side members, and a horizontally disposed flange projecting inwardly from the lower end of each of said side members, the free ends of the flanges of each pad being spaced apart to form an opening for a mounting bolt, at least two of said pads being superimposed upon each of said slats, and means operatively connected to the portion of each slat adjacent each pad and engageable with the flanges of said pad for effecting limited up and down movement of said pad.

3. In a support, a frame including a pair of spaced side pieces, at least two slats arranged in parallel spaced relation positioned transversely of said side pieces intermediate the ends thereof and having their ends fixedly attached to said side pieces, a plurality of mounting pads each including a pair of laterally spaced upright side members, a top piece extending over the upper ends of said side members, and a horizontally disposed flange projecting inwardly from the lower end of each of said side members, the free ends of the flanges of each pad being spaced apart to form an opening for a mounting bolt, at least two of said pads being superimposed upon each of said slats, there being a closed slot in each of said slats adjacent each pad, a bolt including a shank and a head on one end of the shank disposed with the head exteriorly of and below each of said slots and having the shank extending through said slot, through the opening between the flanges of the adjacent pad, and through a hole provided in the top member of said pad, and means operatively connected to the portion of each slat adjacent each pad and engageable with the flanges of said pad for effecting limited up and down movement of said pad.

References Cited in the file of this patent

UNITED STATES PATENTS

| | | |
|---|---|---|
| 802,394 | Hill | Oct. 24, 1905 |
| 1,453,416 | Stanley | May 1, 1923 |
| 2,885,165 | Smolen | May 5, 1959 |